US011972042B2

(12) United States Patent
Lundell et al.

(10) Patent No.: US 11,972,042 B2
(45) Date of Patent: Apr. 30, 2024

(54) VARIABLE INTENSITY DISTRIBUTIONS FOR GAZE DETECTION ASSEMBLY

(71) Applicant: Microsoft Technology Licensing, LLC, Redmond, WA (US)

(72) Inventors: Benjamin Eliot Lundell, Seattle, WA (US); David C Rohn, Fort Collins, CO (US); Curtis Alan Tesdahl, Fort Collins, CO (US); Marko Bezulj, Belgrade (RS); Christopher Charles Aholt, Newcastle, WA (US); Navid Poulad, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 394 days.

(21) Appl. No.: 17/348,551

(22) Filed: Jun. 15, 2021

(65) Prior Publication Data
US 2022/0397956 A1    Dec. 15, 2022

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/0172* (2013.01); *G02B 2027/0187* (2013.01)

(58) Field of Classification Search
CPC . G06F 3/013; G02B 27/0093; G02B 27/0172; G02B 2027/0187
See application file for complete search history.

(56) References Cited

U.S. PATENT DOCUMENTS

| 8,971,570 B1* | 3/2015 | Raffle | G02B 27/017 |
| | | | 382/103 |
| 2015/0310253 A1* | 10/2015 | Agrawal | H04N 23/11 |
| | | | 382/103 |

FOREIGN PATENT DOCUMENTS

| WO | 2013067230 A1 | 5/2013 |
| WO | 2019067731 A1 | 4/2019 |

OTHER PUBLICATIONS

"International Search Report and Written Opinion Issued in PCT Application No. PCT/US22/028998", dated Sep. 1, 2022, 13 Pages.

* cited by examiner

*Primary Examiner* — Christopher M Brandt
(74) *Attorney, Agent, or Firm* — Alleman Hall & Tuttle LLP (57) ABSTRACT

A gaze detection assembly comprises a plurality of infrared (IR) light emitters configured to emit IR light toward a user eye and an IR camera configured to sequentially capture IR images of the user eye. A controller is configured to, during a reference frame, control the plurality of IR light emitters to emit IR light toward the user eye with a reference intensity distribution. During the reference frame, an IR image is captured depicting a first glint distribution on the user eye. Based at least in part on the first glint distribution, during a subsequent frame, the plurality of IR light emitters are controlled to emit IR light toward the user eye with a subsequent intensity distribution, different than the reference intensity distribution. During the subsequent frame, a second IR image is captured depicting a second glint distribution on the user eye.

15 Claims, 9 Drawing Sheets

VARIABLE INTENSITY DISTRIBUTIONS FOR GAZE DETECTION ASSEMBLY

BACKGROUND

Some computing devices are equipped with eye-tracking devices configured to output the estimated gaze direction of a user eye.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A gaze detection assembly comprises a plurality of infrared (IR) light emitters configured to emit IR light toward a user eye and an IR camera configured to sequentially capture IR images of the user eye. A controller is configured to, during a reference frame, control the plurality of IR light emitters to emit IR light toward the user eye with a reference intensity distribution. During the reference frame, an IR image is captured depicting a first glint distribution on the user eye. Based at least in part on the first glint distribution, during a subsequent frame, the plurality of IR light emitters are controlled to emit IR light toward the user eye with a subsequent intensity distribution, different than the reference intensity distribution. During the subsequent frame, a second IR image is captured depicting a second glint distribution on the user eye.

DETAILED DESCRIPTION

Figure 1:
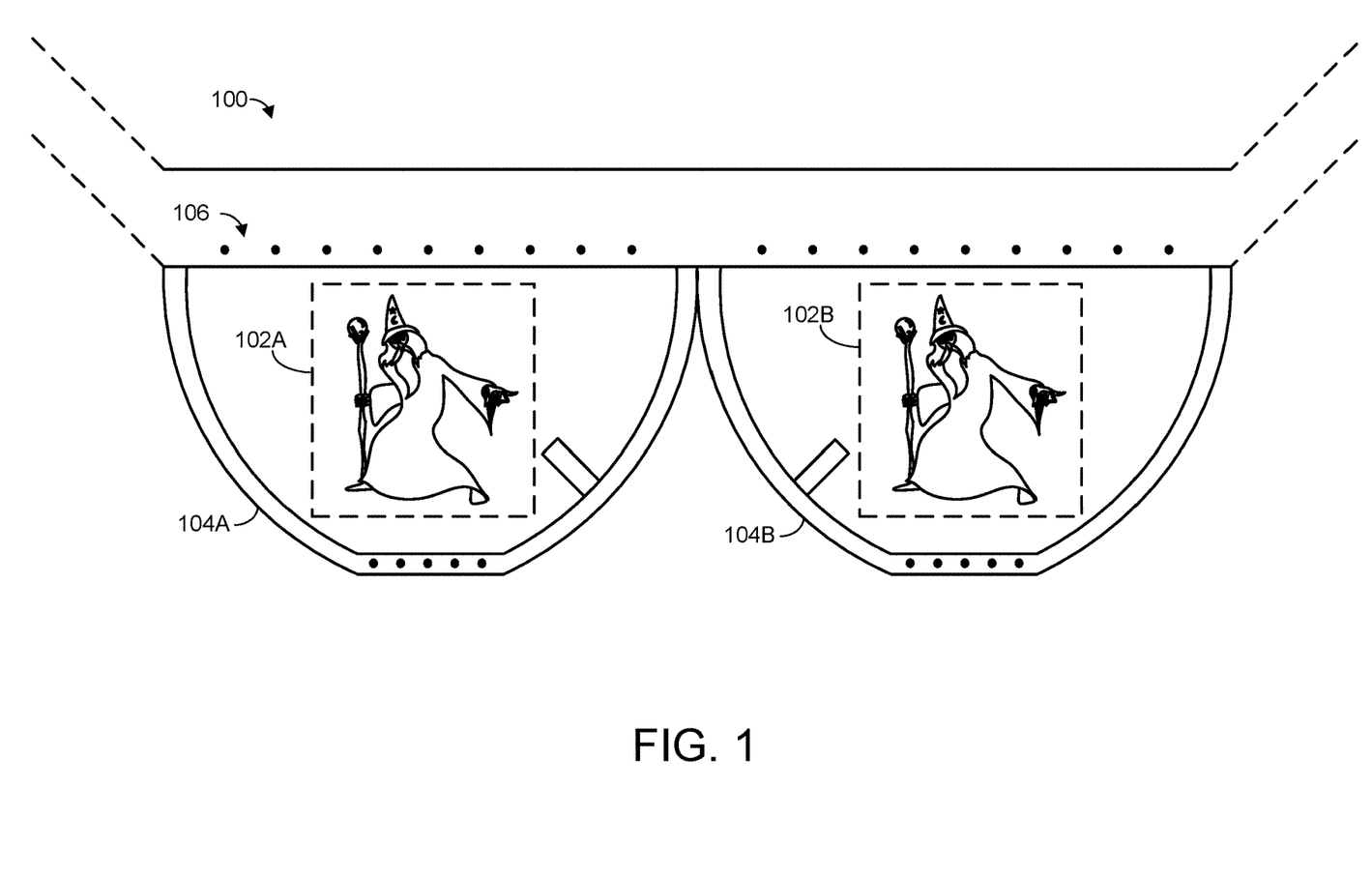
FIG. 1 schematically shows an example head-mounted display device (HMD).

Some computing devices incorporate eye-tracking technologies that enable the computing device to detect and respond to movements of a user eye. As one non-limiting example, FIG. 1 schematically depicts an example head-mounted display device (HMD) 100 configured to present virtual imagery to a user's eyes. HMD 100 is displaying a left virtual image 102A via a left near-eye display 104A, and a right virtual image 102B via a right near-eye display 104B. As will be described in more detail below, HMD 100 also includes a gaze tracking assembly 106 configured to output a gaze direction estimate for each user eye during each of a plurality of frames.

The specific virtual images 102A and 102B shown in FIG. 1 are non-limiting examples. In general, a virtual image may take the form of any suitable visual content that is rendered by a computing display and presented for viewing by a human eye. Display of virtual images may be updated with any suitable frequency—e.g., to create the impression that the virtual images are moving, and/or to create the impression that the virtual images are maintaining a fixed position relative to some reference point (such as the environment or the user's current position). As non-limiting examples, virtual images may be updated with any suitable framerate, such as 60 frames-per-second (FPS), 90 FPS, or 120 FPS.

The near-eye displays may be substantially opaque, thereby substantially replacing a user's view of their surrounding real-world environment with imagery presented on the near-eye displays. Alternatively, the near-eye displays may be at least partially transparent, enabling the user to retain at least some visibility of their surrounding real-world environment. The virtual images may be presented in front of the user's eyes (not shown) in such a manner as to create the illusion that virtual objects are present in the user's real-world environment.

It will be understood that HMD 100 is a non-limiting example, and that the gaze detection assemblies described herein may be used with any suitable computing devices having any suitable form factors and hardware configurations. For example, a gaze detection assembly may be integrated with, or communicatively coupled with, computing devices such as desktops, laptops, tablets, smartphones, smartwatches, HMDs, automotive computing systems, video game systems, media systems, etc. In the case where the computing device is an HMD, it may have two separate near-eye displays as is the case with HMD 100, or may have another suitable number of near-eye displays (e.g., one single near-eye display that displays virtual images to both user eyes). In some examples, a gaze detection assembly may be integrated with, used with, and/or controlled by, computing system 900 described below with respect to FIG. 9.

In general, a "gaze detection assembly" as described herein may be used to output a gaze direction estimate for at least one user eye, and thus a computing device may include one or more different gaze detection assemblies for tracking movements of one or more user eyes. In some cases, a gaze direction assembly may be configured to output gaze direction estimates for two human eyes at once. In other cases, a computing device may include two different gaze direction assemblies, one for each of a user's eyes.

It will be understood that a gaze direction estimate output by a gaze detection assembly as described herein may be used for any suitable purpose. As one example, the current gaze direction of a user eye, and/or the movements of the user eye over time, may be interpreted as inputs to the HMD—e.g., the user may view and manipulate virtual objects presented via one or more near-eye displays by moving their eyes. As another example, the user's gaze direction estimate may be used to infer whether the user is looking toward and/or focusing on any real-world objects in their surrounding environment. For example, while the user is attending a presentation, the user's gaze direction estimates output by a gaze detection assembly over time may be used to quantify how often the user is paying attention to the presenter, as compared to paying attention to other real or virtual objects.

A gaze detection assembly may operate by emitting infrared (IR) light toward a user eye, imaging reflected glints on the eye (e.g., corneal reflections), and using the positions of the glints to determine the three-dimensional position and orientation of the cornea with respect to the camera. For the purposes of the present disclosure, IR light may include any electromagnetic radiation having a wavelength of between 700 nm and 1 mm. Notably, as used herein, "IR light" includes electromagnetic radiation in the near-infrared spectrum—e.g., electromagnetic radiation having a wavelength of between 700 nm and 2500 nm. This information may be used to estimate the "gaze direction" of the user eye, for instance in combination with a user-specific constant (e.g., the angle between the visual axis and pupillary axis, or "angle kappa").

However, different individuals have different eye sizes, shapes, and interpupillary distances (IPDs), meaning any given user's eye can end up having a variable position with respect to the IR emitters and IR camera, as compared to the eyes of other individuals. This can complicate attempts to design one-size-fits-all devices that accurately and efficiently detect the gaze directions of diverse user populations.

For instance, a gaze detection assembly may include more IR emitters than would be necessary for any single user, which may allow a single device to be used by different users having diverse eye shapes, sizes, and/or spacings, as well as improve eye tracking in situations where the gaze detection assembly moves relative to any particular user's eye. However, this may also increase the electrical power consumed by the device. For example, it is likely that power will be consumed in emitting IR light that does not reflect off the user eye, does not correspond to a glint in an IR image depicting the user eye, and/or is otherwise not useful in estimating the gaze direction of the user eye.

Accordingly, the present disclosure is directed to a gaze detection assembly configured to emit IR light toward a user eye with different intensity distributions during different time frames, based on a glint distribution observed on a prior frame. For example, during a reference frame, a plurality of IR light emitters may emit IR light with a reference intensity distribution, in which all of the IR light emitters emit IR light at a default brightness level. After the reference frame, a controller of the gaze detection assembly may determine that the intensity of the IR light could be reduced during a subsequent frame—e.g., by deactivating one or more of the emitters, and/or reducing the brightness of the IR light emitted by one or more of the emitters—while still outputting gaze direction estimates for the user eye with sufficient accuracy.

In this manner, a gaze detection assembly may include more IR emitters than would be necessary for any single user, in order to project IR light into a relatively large eyebox that will allow eye tracking for a wide range of different users with different eye shapes, sizes, and positions. However, the intensity distribution used for any particular user can be tuned over the course of several frames to reduce the power consumption associated with eye tracking, while still maintaining sufficient accuracy. Additionally, or alternatively, the techniques described herein may allow the size and/or overall power consumption of a gaze detection assembly to be reduced, again without unduly compromising the accuracy of the eye tracking performed by the gaze detection assembly.

Figure 2:
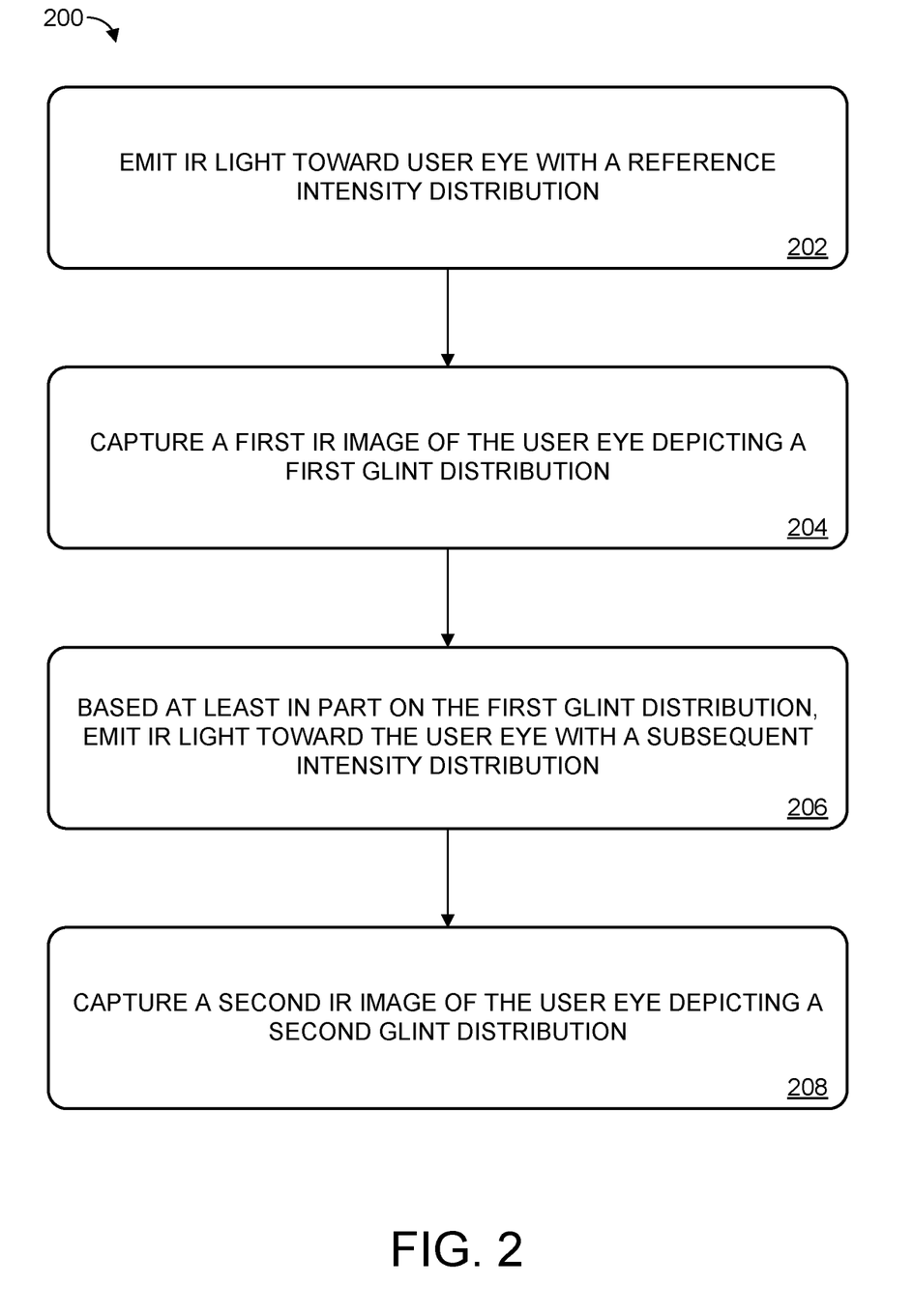
FIG. 2 illustrates an example method for a gaze tracking assembly.

FIG. 2 illustrates an example method 200 for a gaze detection assembly. As will be described in more detail below, a gaze detection assembly may generally comprise a plurality of IR light emitters configured to emit IR light toward a user eye, an IR camera configured to sequentially capture IR images of the user eye, and a controller configured to coordinate activity of the IR light emitters and IR camera. A gaze detection assembly may be used with, integrated into, or controlled by any suitable computing system of one or more computing devices. In some examples, a gaze detection assembly may be used with computing system 900 described below with respect to FIG. 9.

At 202, method 200 includes, during a reference frame, controlling a plurality of IR light emitters to emit IR light toward a user eye with a reference intensity distribution. This is schematically illustrated with respect to FIG. 3, again showing near-eye display 104A of HMD 100. It will be understood that any of the gaze detection techniques described herein with respect to near-eye display 104A may also apply to near-eye display 104B, corresponding to a second user eye, or to any other suitable gaze detection device.

Figure 3:
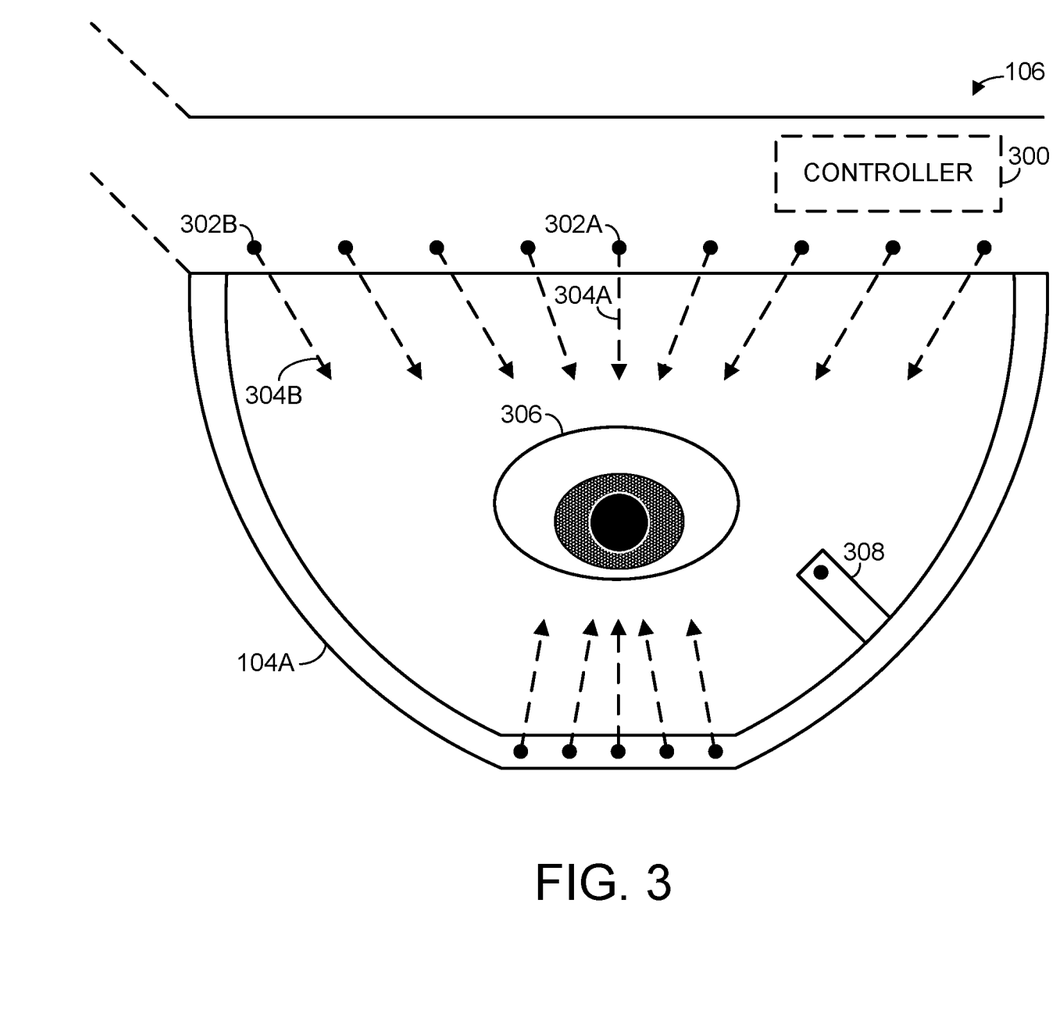
FIG. 3 schematically depicts an example gaze tracking assembly emitting IR light toward a user eye with a reference intensity distribution.

Furthermore, for simplicity virtual image 102A shown in FIG. 1 is omitted from FIG. 3. It will be understood that an HMD may continue displaying and updating virtual images for viewing by a user eye during use of a gaze detection assembly. For instance, display of virtual imagery by near-eye display 102A may occur simultaneously with any or all steps of method 200.

As discussed above with respect to FIG. 1, HMD 100 includes a gaze detection assembly 106, which in turn includes a controller 300. Controller 300 controls operation of a plurality of IR light emitters, represented in FIG. 3 by black circles. In FIG. 3, the gaze detection assembly includes two rows of IR light emitters: a top row including nine different emitters and a bottom row including five different emitters. Two IR light emitters of the top row are labeled in FIG. 3 as IR light emitters 302A and 302B. It will be understood, however, that this configuration of IR light emitters is a simplified, non-limiting example. In practical scenarios, a gaze detection assembly may include any number of different IR light emitters, having any suitable spatial positions and/or orientations with respect to one another and any other components of the gaze detection assembly. In particular, IR light emitters may be included along the rim of each near-eye display 104A/104B, along a nasal support ridge of the HMD, along one or more temple support portions of the HMD, etc.

Controller 300 may be implemented via any suitable combination of computer logic componentry and data storage componentry. For example, controller 300 may take the form of a suitable computer processor or application-specific integrated circuit (ASIC). In some examples, controller 300 may be implemented as logic subsystem 902 described below with respect to FIG. 9.

In FIG. 3, controller 300 is controlling the plurality of IR light emitters to emit IR toward a user eye with a reference intensity distribution, where IR light is represented by dashed arrows extending away from each of the plurality of IR light emitters. This includes two emissions of IR light, 304A and 304B, respectively emitted toward a user eye 306 by IR light emitters 302A and 302B. An "intensity distribution" of IR light emitted by the plurality of IR light emitters is affected both by the number of IR light emitters emitting IR light toward the user eye, as well as the brightness of the IR light originating from each individual IR light emitter. Thus, two different intensity distributions may differ according to one or both of the intensity of IR light emitted by one or more IR light emitters, and the total number and distribution of emitters emitting IR light during any given frame.

It will be understood that the angles of the IR light emissions depicted in FIG. 3 are non-limiting examples used only for the sake of illustration. In practical applications, IR light emitters may emit IR light toward a user eye, or generally into an eyebox, with any suitable angles and/or diffusion characteristics. In some examples, the angle at which each individual IR light emitter emits IR light may be fixed. In other examples, one or more of the IR light emitters may be steerable by the controller to emit IR light at a variety of different angles.

In the non-limiting reference intensity distribution schematically depicted in FIG. 3, all of the plurality of IR light emitters of the gaze detection assembly are emitting IR light toward user eye 306. It will be understood, however, that a "reference intensity distribution" need not require every IR light emitter of a gaze detection assembly to be active. Rather, in some scenarios, a gaze detection assembly may emit IR light toward a user eye with a reference intensity distribution in which one or more IR light emitters are inactive. Furthermore, in a "reference intensity distribution," each of the IR light emitters may emit IR light with substantially the same brightness (e.g., a maximum brightness level, and/or a default brightness level), or one or more of the IR light emitters may emit IR light with a different brightness than other IR light emitters of the plurality, depending on the implementation.

As described above, IR light is emitted toward the user eye with a reference intensity distribution during a "reference frame," which may be one frame of a plurality of sequential time frames. In some cases, as will be described in more detail below, the intensity distribution with which IR light is emitted toward the user eye may change from one frame to another. The plurality of sequential time frames may have any suitable frame rate—e.g., 60 FPS, 90 FPS, or 120 FPS. The frame rate of the gaze detection assembly may in some cases be synchronized with the frame rate at which virtual images are displayed and updated, or the two rates may be independent.

Returning briefly to FIG. 2, at 204, method 200 includes, during the reference frame, capturing a first IR image of the user eye. The first IR image depicts a first glint distribution on the user eye resulting from reflections of the IR light of the reference intensity distribution (e.g., reflections of the IR light on the cornea of the eye). In the example of FIG. 3, gaze detection assembly 106 includes an IR camera 308 configured to sequentially (e.g., once per frame) capture images of user eye 306. IR images captured by IR camera 308 may depict glints on the eye corresponding to reflections of the IR light emitted by the plurality of IR light emitters.

Figure 4:
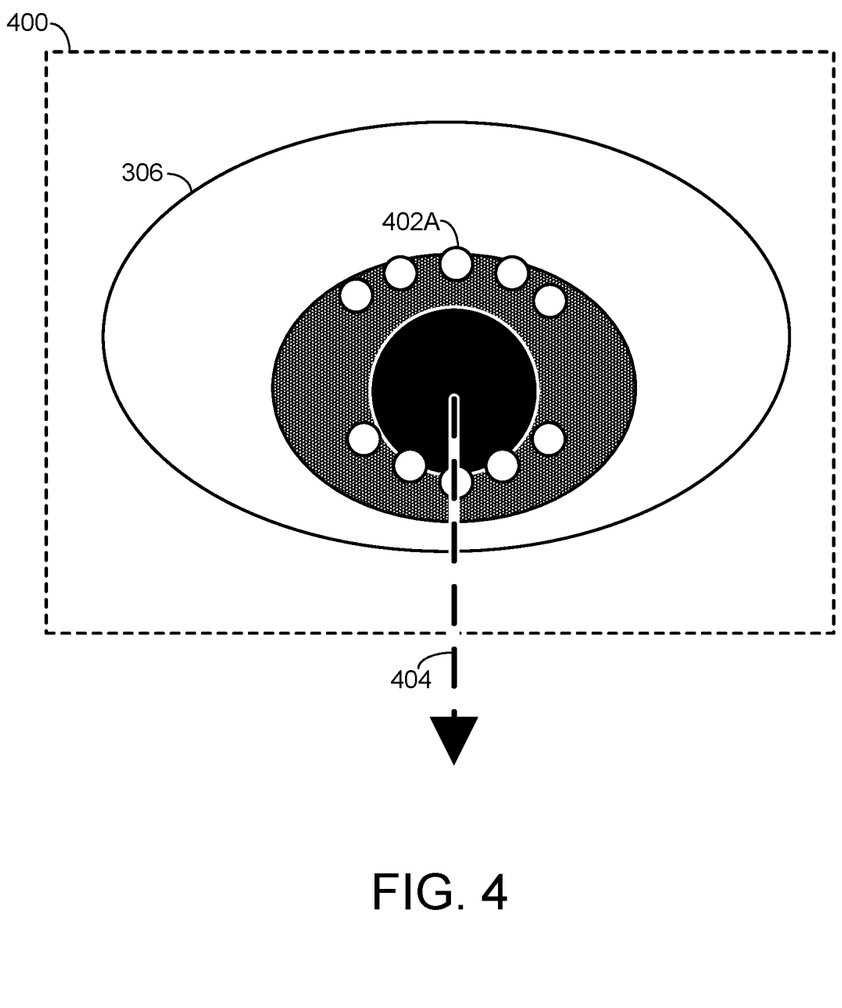
FIG. 4 schematically depicts an example infrared (IR) image of a user eye captured by an IR camera of the gaze tracking assembly of FIG. 3.

FIG. 4 schematically shows an example IR image 400 captured by IR camera 308. As shown, the IR image depicts a first distribution of IR glints on user eye 306. The IR glints are represented in FIG. 4 by white circles and correspond to reflections of the IR light emitted by the plurality of IR light emitters on the user eye. One particular glint is labeled 402A, corresponding to IR light 304A emitted by IR light emitter 302A in FIG. 3. Other glints of the first glint distribution in FIG. 4 correspond to other IR light emitters of the plurality of IR light emitters shown in FIG. 3.

In some cases, after capturing an IR image of the user eye depicting a first glint distribution, the controller may be configured to output a first gaze direction estimate of the user eye based at least in part on the first glint distribution. This is schematically illustrated in FIG. 4, in which the controller has estimated a gaze direction 404 of user eye 306, represented as a dashed arrow extending away from the eye pupil. It will be understood that the gaze direction estimate may be expressed in any suitable form. For example, the gaze direction estimate may be expressed as an array representing a vector in a suitable frame of reference (e.g., a frame of reference of the user eye, a frame of reference of the IR camera, or a frame of reference of a near-eye display).

The gaze direction of a user eye may be estimated in any suitable way. In some cases, the gaze direction of the user eye may be estimated by comparing the distribution of glints on the user eye to anatomical features of the user eye. For example, the positions of glints on the user eye may be compared to the center of the pupil of the user eye, as detected via image analysis for example. In general, based on the positions of the glints on the eye surface, the controller may determine the position and orientation of the cornea relative to the camera. This may be useable to infer the gaze direction of the user eye—e.g., in conjunction with an angle kappa or other suitable metric. In some examples, multiple reflections for each emission of IR light may be detected—e.g., one reflection on the eye cornea, and another reflection on the eye lens.

In some cases, the controller may additionally be configured to output a first confidence parameter based at least in part on the first glint distribution. The first confidence parameter may take the form of any suitable value that represents the confidence of the controller that its estimate of the eye's gaze direction corresponds to the actual gaze direction of the user eye. As non-limiting examples, the first confidence parameter may be expressed as a percentage or a value between 0 and 1. The first confidence parameter may be calculated in any suitable way based at least in part on an observed glint distribution. In some cases, the confidence parameter may be proportional to the number of glints detected in an IR image of a user eye, and may be affected by the distribution of those glints relative to one another and to anatomical features of the user eye.

In FIG. 4, the first glint distribution depicted in IR image 400 includes ten distinct glints. By contrast, in FIG. 3, fourteen IR light emitters emitted IR light toward the user eye. In other words, due to the size, shape, and/or position of user eye 306 within the eyebox relative to HMD 100, not all of the IR light emitted by the plurality of IR light emitters is reflecting to the camera from the user eye responsive to the first glint distribution. This represents an inefficient use of electrical power, as power is expended to emit IR light that does not reflect to the camera, and therefore is not used to estimate a gaze direction of the user eye.

To this end, returning briefly to FIG. 2, method 200 includes, at 206, controlling the plurality of IR light emitters to emit IR light toward the user eye with a subsequent intensity distribution, based at least in part on the first glint distribution. The subsequent intensity distribution is different from the reference intensity distribution, and is emitted during a subsequent frame occurring after the reference frame. In some cases, emitting IR light toward the user eye with the subsequent intensity distribution may consume less electrical power than emitting IR light toward the user eye with the reference intensity distribution, although this need not always be the case. Furthermore, the intensity distribution with which IR light is emitted need not only be changed in circumstances where some IR light emitters emit IR light that does not correspond to glints in the observed glint distribution, as in the above example. Rather, in general, the intensity distribution with which IR light is emitted may be changed from one frame to the next for any number of reasons and under any number of circumstances.

As one non-limiting example, controlling the plurality of IR emitters to emit IR light toward the user eye with the subsequent intensity distribution may include reducing (or increasing) an intensity of the IR light emitted by one or more IR light emitters relative to the reference intensity distribution. As another non-limiting example, controlling the plurality of IR emitters to emit IR light toward the user eye with the subsequent intensity distribution may include deactivating (or activating) one or more IR light emitters relative to the reference intensity distribution.

Figure 5:
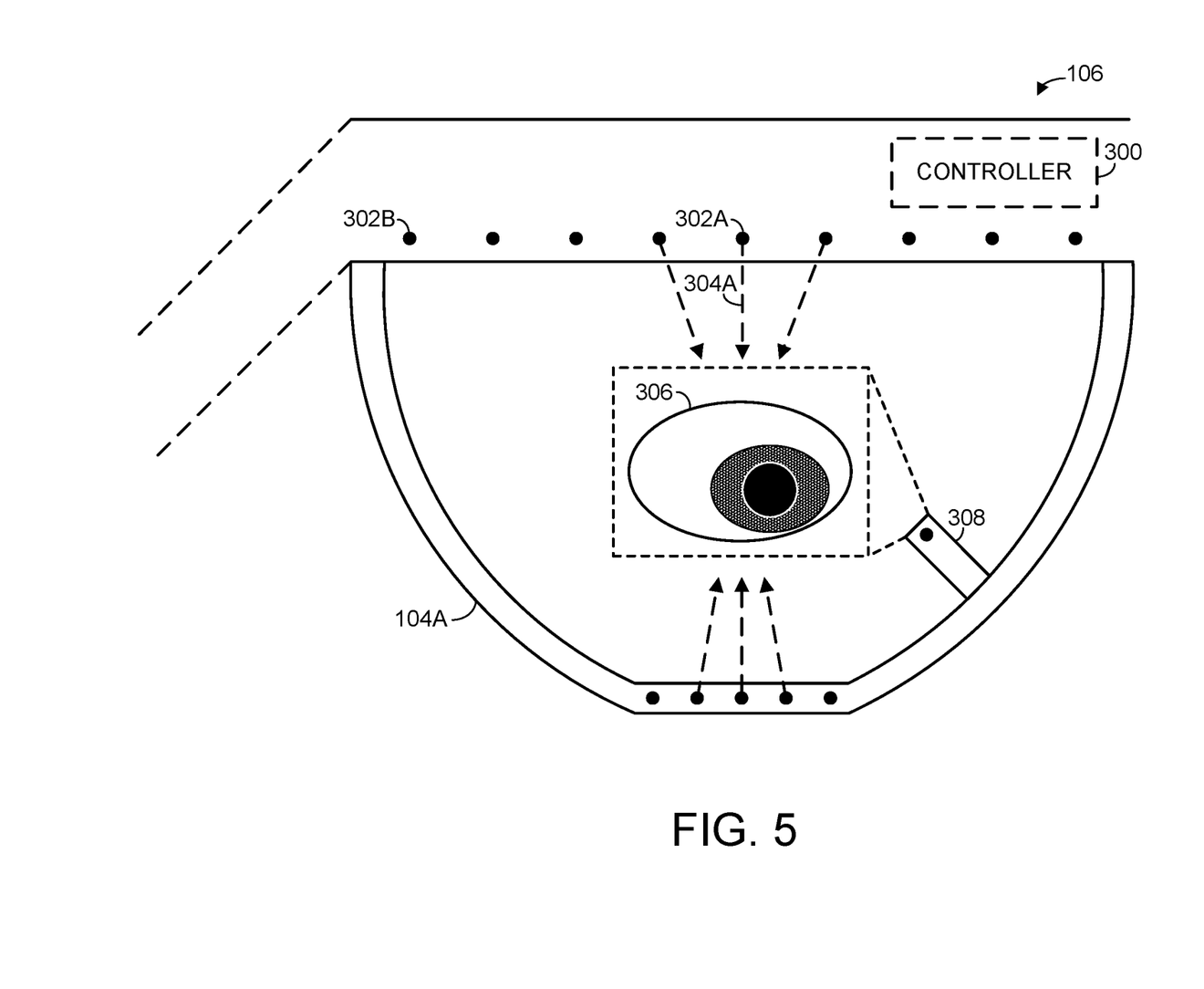
FIG. 5 schematically depicts the gaze tracking assembly of FIG. 3 emitting IR light toward a user eye with a subsequent intensity distribution.

This is schematically illustrated with respect to FIG. 5, again showing near-eye display 104A of HMD 100, along with gaze detection assembly 106. Controller 300 is controlling the plurality of IR light emitters to emit light toward the user eye with a subsequent intensity distribution that differs from the reference intensity distribution. Specifically, in the example of FIG. 5, controller 300 has deactivated eight of the plurality of IR light emitters as compared to the reference intensity distribution. For instance, IR light emitter 302A is still emitting IR light 304A toward user eye 306, but IR light emitter 302B is not emitting IR light as part of the subsequent intensity distribution.

Any suitable criteria may be used for determining which of the plurality of IR light emitters should be deactivated, and/or which of the plurality of IR light emitters should change the brightness of its emitted IR light, in the subsequent intensity distribution. In some cases, the controller may be configured to identify correspondences between individual glints of the first glint distribution and individual IR light emitters of the plurality of IR light emitters, and deactivate, or reduce the brightness of, one or more IR light emitters that do not correspond to glints of the first glint distribution. For example, in FIG. 3, controller 300 may determine that IR light 304B emitted by IR light emitter 302B in the reference intensity distribution did not correspond to a glint of the first glint distribution depicted in IR image 400 of FIG. 4. The controller may therefore deactivate IR light emitter 302B when controlling the plurality of IR light emitters to emit IR light with the subsequent intensity distribution.

It will be understood, however, that the controller may deactivate one or more IR light emitters for the subsequent intensity distribution that did contribute to glints of the first glint distribution. Similarly, the controller may refrain from deactivating any IR light emitters that do not correspond to glints of a prior glint distribution. For instance, the controller may identify glints in the glint distribution that are relatively less useful in estimating the gaze direction, and may therefore deactivate IR light emitters corresponding to such less useful glints. Similarly, the controller may determine that a particular IR light emitter would, if active, likely form a glint in future IR images that would be useful in estimating the gaze direction of the user eye during future frames, and activate such an IR light emitter for one or more future frames.

As additional non-limiting examples, the intensity distribution of IR light may be changed from one frame to another based on one or both of a number of glints detected in a prior IR image of the user eye, and a confidence parameter associated with a prior estimated gaze direction of the user eye. For example, the controller may be useable to output a gaze direction estimate based at least on detecting some minimum number of glints (e.g., six) in an IR image. Accordingly, upon detecting more glints in an IR image than this minimum number, the controller may deactivate, or otherwise reduce the brightness of IR light emitted by, one or more IR light emitters for the next frame. Similarly, the controller may have a minimum confidence threshold for gaze direction estimates. Upon determining that a prior gate direction estimate had a confidence parameter that is significantly higher than this confidence threshold (e.g., a confidence parameter of 99% and a threshold of 80%), the controller may deactivate, or otherwise reduce the brightness of IR light emitted by, one or more IR light emitters for the next frame. In either case, the controller may still output accurate estimates of the gaze direction of the user eye while reducing power consumption associated with the emission of IR light.

In some cases, the determination as to whether to change the intensity distribution of emitted IR light from one frame to another may be based at least in part on a current battery charge level of a computing device providing power to the gaze detection assembly (or the gaze detection assembly itself, in cases where it has an independent battery). For example, in situations where the battery charge level is relatively high, the computing device may opt to emit IR light using intensity distributions that result in relatively more accurate estimates of the gaze direction of the user eye, at the cost of increased power consumption. As the battery charge level of the device decreases, the computing device may opt to use intensity distributions that reduce the brightness of the emitted IR light, and/or deactivate one or more IR light emitters, to conserve power.

As another non-limiting example, the determination as to whether to change the intensity distribution may be based at least in part on a current activity of a user of the computing device. For example, if the user is currently performing an activity that requires relatively precise eye tracking, then the gaze detection assembly may change the intensity distribution to increase the overall intensity of emitted IR light. Similarly, if the user is currently performing an activity that can tolerate relatively less precise eye tracking, then the gaze detection assembly may reduce the overall intensity of emitted IR light.

As another non-limiting example, the determination as to whether to change the intensity distribution may be based on determining that one or more IR light emitters are interfering with the gaze detection assembly. For instance, IR light emitted by one or more IR light emitters may form glints on surfaces other than the user eye—e.g., on the user's eyeglasses. Presence of such glints in an IR image of the user eye can interfere with the accuracy of the gaze direction estimates output based on the IR image. To this end, the controller may change the quantity of IR light emitters emitting light, and/or the brightness of IR light emitted by one or more of the IR light emitters, based at least in part on detecting one or more glints in an IR image that are detrimental to the gaze detection process—e.g., because one or more emitters are forming glints on the user's eyeglasses.

The present disclosure has thus far focused on changing the intensity distribution of emitted IR light in a manner that reduces the total amount of emitted IR light from one frame to the next—e.g., to reduce power consumption. It will be understood, however, that in some cases the intensity of IR light emitted by one or more IR light emitters may increase from one frame to the next. This may be done, for example, when a confidence parameter associated with a prior estimated gaze direction of a user eye is below a minimum confidence threshold. In response, the controller may, during the next frame, control the plurality of IR light emitters to emit IR light with an intensity distribution that is likely to increase the confidence parameter of the next gaze direction estimate—e.g., by increasing the number of active IR light emitters, and/or by increasing the brightness of IR light emitted by one or more emitters.

As another example, the intensity of IR light emitted by one or more IR light emitters may be changed based on a current position and/or gaze direction of a user eye relative to the gaze detection assembly. For example, the intensity of emitted IR light may in some cases be attenuated by lens roll-off for some eye positions and/or gaze direction angles. Accordingly, in some cases, the intensity of light emitted by one or more IR light emitters may be increased from one frame to the next—e.g., to increase the accuracy of a gaze direction estimate in situations that would otherwise be adversely affected by lens roll-off.

Figure 6:
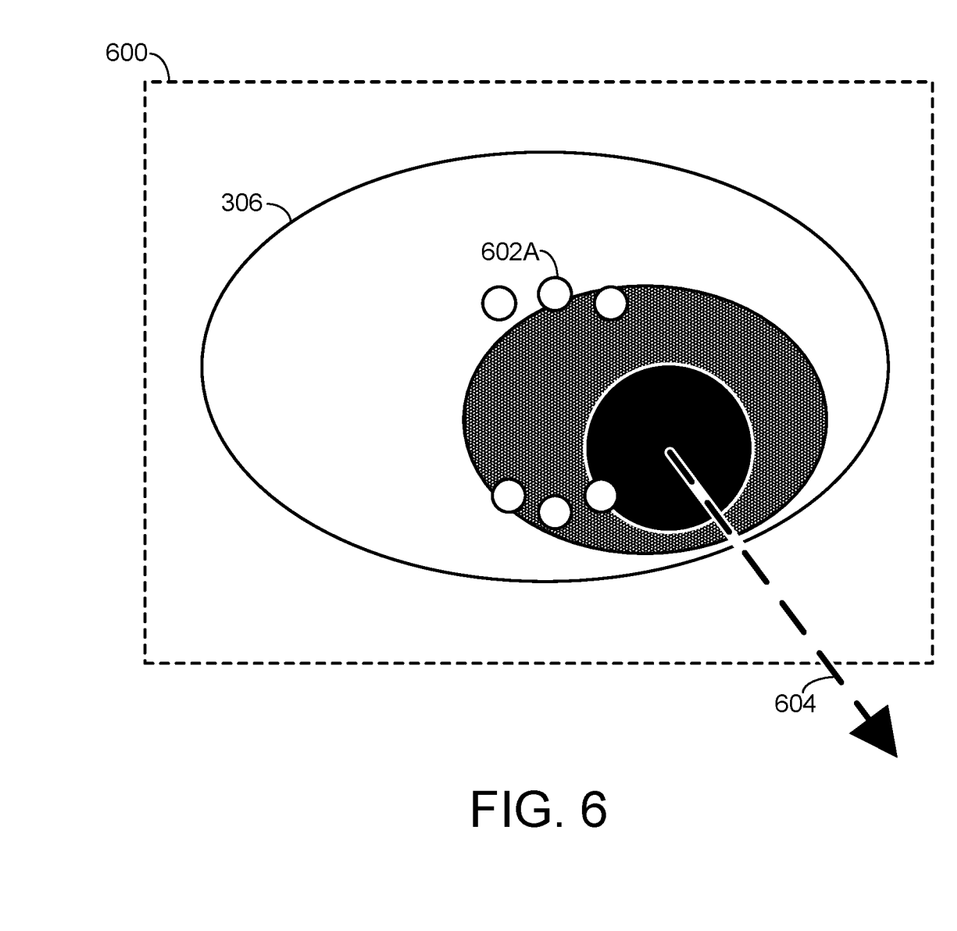
FIG. 6 schematically depicts an example IR image of a user eye captured by an IR camera of the gaze tracking assembly of FIG. 5.

Returning briefly to FIG. 2, method 200 includes, at 208, capturing a second IR image of the user eye, the second IR image depicting a second glint distribution on the user eye resulting from reflections of the IR light of the subsequent intensity distribution. This is schematically illustrated with respect to FIG. 6, showing a second example IR image 600, again depicting user eye 306. As with IR image 400 described above with respect to FIG. 4, IR image 600 may be captured by camera 308 of gaze detection assembly 106, or another suitable camera. Furthermore, IR image 600 depicts a second glint distribution on user eye 306, corresponding to reflections of the IR light emitted by the plurality of IR light emitters as the subsequent intensity distribution. One such glint 602A corresponds to a reflection of the IR light 304A emitted by IR light emitter 302A during the subsequent frame.

After capturing a second IR image of the user eye depicting a second glint distribution, the controller may be configured to output a second gaze direction estimate of the user eye based at least in part on the second glint distribution. This is schematically illustrated in FIG. 6, in which the controller has estimated a gaze direction 604 of user eye 306, represented as a dashed arrow extending away from the eye pupil. The second gaze direction may be estimated in any suitable way as described above with respect to the first gaze direction estimate—e.g., by comparing the positions of glints on the eye to anatomical features of the eye, such as the center of the pupil.

In some cases, the controller may be configured to output a second confidence parameter based at least in part on the second glint distribution. The second confidence parameter may represent a confidence of the controller that its estimate of the current gaze direction of the eye corresponds to the actual gaze direction of the eye. The second confidence parameter may be calculated and output substantially as described above with respect to the first confidence parameter.

The present disclosure has thus far focused primarily on two frames—a reference frame during which IR light is emitted with a reference intensity distribution, and a subsequent frame during which IR light is emitted with a subsequent intensity distribution. It will be understood, however, that IR light may be emitted with any number of different intensity distributions during any number of different frames. After controlling the plurality of IR light emitters to emit light with the subsequent intensity distribution during the subsequent frame, the controller may continue to use the subsequent intensity distribution during one or more subsequent frames. Additionally, or alternatively, the controller may update the intensity distribution on each frame.

In some cases, the controller may again use the reference intensity distribution during one or more frames after the subsequent frame. For example, the controller may be configured to, during a recheck frame occurring one or more frames after the subsequent frame, control the plurality of IR light emitters to emit IR light toward the user eye with the reference intensity distribution. In this manner, the controller may periodically, and/or in response to certain stimuli, emit IR light using an intensity distribution that is likely to result in a gaze direction estimate having relatively high confidence, in order to preserve the accuracy of eye tracking over time.

In some cases, a recheck frame may be one of a plurality of periodically reoccurring recheck frames separated from one another by a predetermined recheck interval—e.g., a recheck frame may be triggered every five frames. Additionally, or alternatively, a recheck frame may be triggered responsive to the controller outputting a gaze direction estimate of the user eye having an associated confidence parameter below a predetermined confidence threshold. For instance, in a case where the controller maintains a minimum confidence threshold of 80%, and outputs a gaze direction estimate having an associated confidence parameter of 70%, the controller may trigger a recheck frame in which IR light is emitted with the reference intensity distribution. As another example, a recheck frame may be triggered responsive to the controller outputting a gaze direction estimate of the user eye that differs from a preceding gaze direction estimate by more than a difference threshold. This may be the case when, for example, the user eye performs a saccade and its gaze direction changes rapidly. Any suitable difference threshold may be used—e.g., an angular difference of 10° from one frame to another.

In some examples, a recheck frame may be triggered (or the intensity distribution of emitted IR light may otherwise be changed) based at least in part on a predicted future motion of the user eye. For example, over a series of sequential frames, the controller may determine that the gaze direction is consistently changing in a particular direction and with a particular angular velocity. Accordingly, the controller may extrapolate this observed motion into a future frame, and change the intensity distribution in a manner that is well-suited for estimating the gaze direction on the future frame, assuming that the extrapolated motion continues. As another example, the controller may receive information indicating that a user interface element will be displayed at particular display coordinates relative to the near-eye display. Based at least in part on this information, the controller may predict that the user eye will look toward the user interface element, and change the intensity distribution of emitted IR light in a manner that is well-suited for tracking the user eye with the predicted gaze direction.

Furthermore, it will be understood that any or all of these conditions may overlap. For example, the controller may be configured to periodically trigger recheck frames after a predetermined recheck interval, but may trigger a recheck frame early upon determining that an earlier gaze direction estimate has a confidence parameter below a confidence threshold, and/or upon outputting a gaze direction estimate that differs from a prior estimate by more than a difference threshold.

Figure 7:
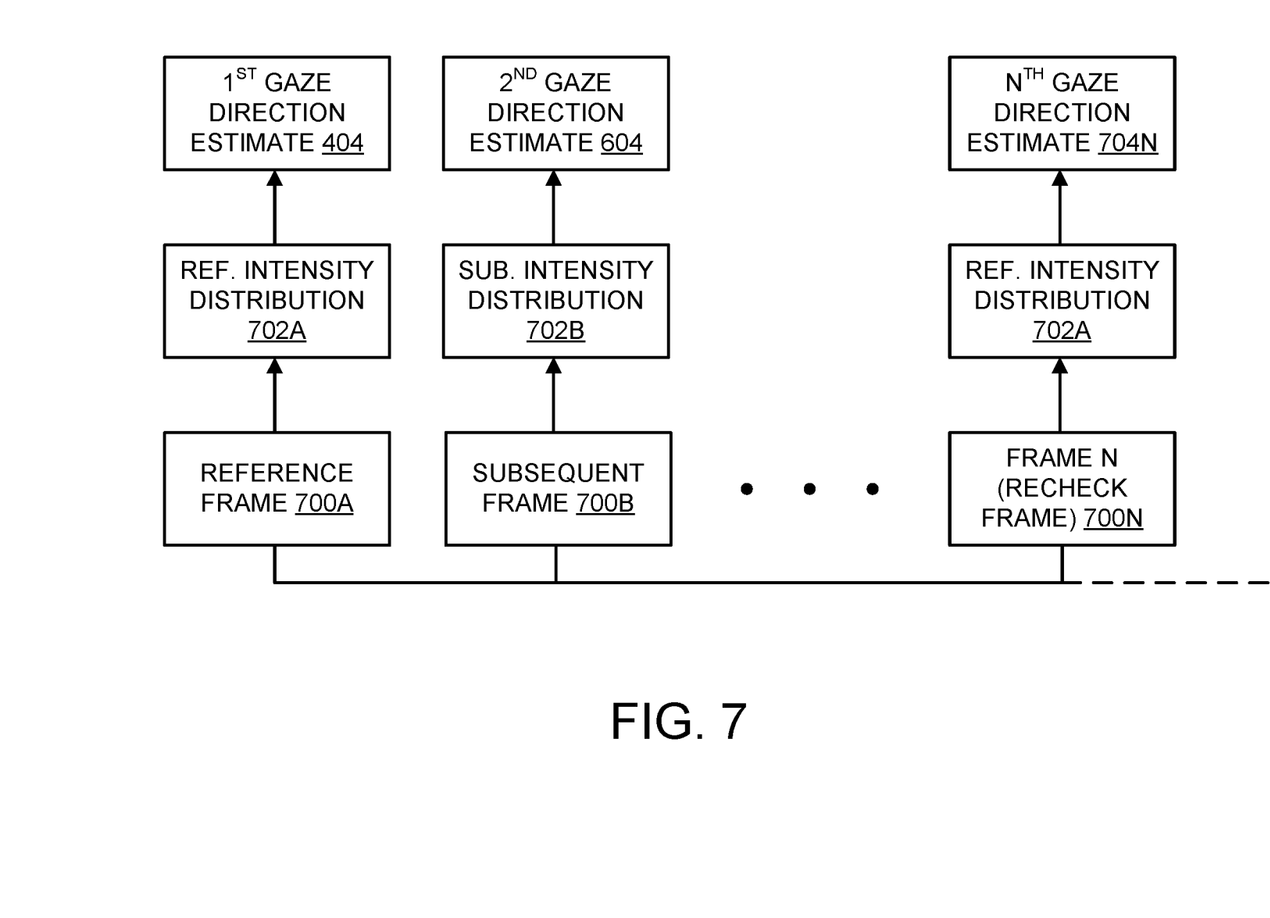
FIG. 7 schematically depicts a plurality of sequential time frames during which a gaze direction estimate of a user eye is output.

FIG. 7 schematically illustrates a sequence of time frames including a recheck frame. Specifically, FIG. 7 schematically represents a reference frame 700A, during which IR light is emitted by a plurality of IR light emitters with a reference intensity distribution 702A, resulting in first gaze direction estimate 404 being output. During a subsequent frame 700B, IR light is emitted using a subsequent intensity distribution 702B, resulting in second gaze direction estimate 604. Some number of frames later, during a recheck frame 700N, IR light is again emitted using the reference intensity distribution 702A, resulting in an $N^{th}$ gaze direction estimate 704N.

It will be understood that the recheck frame may occur any number of frames after the subsequent frame. In some examples, the recheck frame may occur immediately after the reference frame—in other words, the intensity distribution of IR light need not always be changed between the first and subsequent frames.

The present disclosure has thus far primarily focused on scenarios in which one IR image is captured on each time frame. It will be understood, however, that this need not be the case. For example, the controller may in some cases capture multiple IR images of the user eye on some or all time frames—e.g., on each time frame, two or more different IR images of the user eye may be captured. In cases where multiple IR images of the user eye are captured on the same time frame, the intensity distribution used while capturing each image may in some cases change as described herein. For example, in a scenario where multiple IR images of the user eye are captured on the subsequent frame, each IR image may optionally be captured while the same subsequent intensity distribution is used, or the intensity distribution may alternately be varied for each IR image.

Furthermore, the present disclosure has thus far primarily focused on changing the intensity distribution with which IR light is emitted based at least in part on a glint distribution detected in an IR image. In some cases, in addition to or instead of changing an intensity distribution of IR light based on the glint distribution, the controller may selectively refrain from reading some pixel values recorded by an image sensor. As described above, during each of a sequence of frames, IR images of a user eye may be captured by an IR camera—e.g., camera 308. The IR camera may include an image sensor having a plurality of pixels, and when exposed to IR light (e.g., IR light reflecting off the eye), the IR camera may record pixel values for each pixel of the image sensor as an IR image.

In many cases, the controller will read each pixel value for the pixels of the image sensor—e.g., to detect glints of the glint distribution and output a gaze direction estimate for the user eye. However, when information regarding the current position and/or gaze direction of the user eye is known, power and/or time may be conserved when the controller selectively refrains from reading pixel values for some pixels of the image sensor. For example, the controller may read pixel values from each of the plurality of pixels of the image sensor during the reference frame. Based at least in part on the first glint distribution, the controller may read pixel values from less than all of the plurality of pixels during the subsequent frame. For example, based at least in part on the first glint distribution, the controller may determine that pixels near the edge of the image sensor are unlikely to depict IR glints and/or anatomical eye features that are useful in estimating the gaze direction of the user eye, and therefore avoid reading pixel values for those pixels.

Figure 8A:
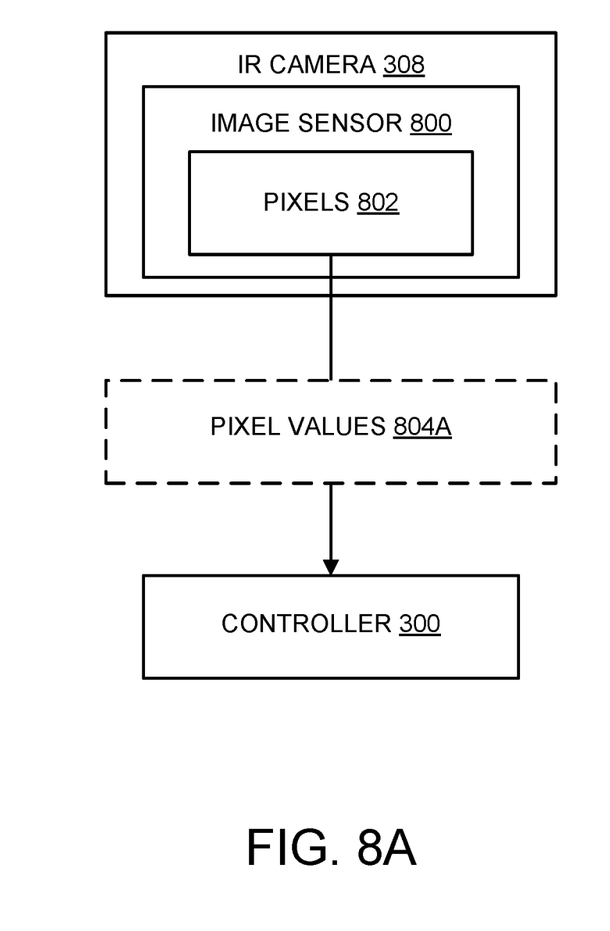
FIGS. 8A and 8B schematically illustrate a controller reading pixel values from an image sensor of an IR camera.
Figure 8B:
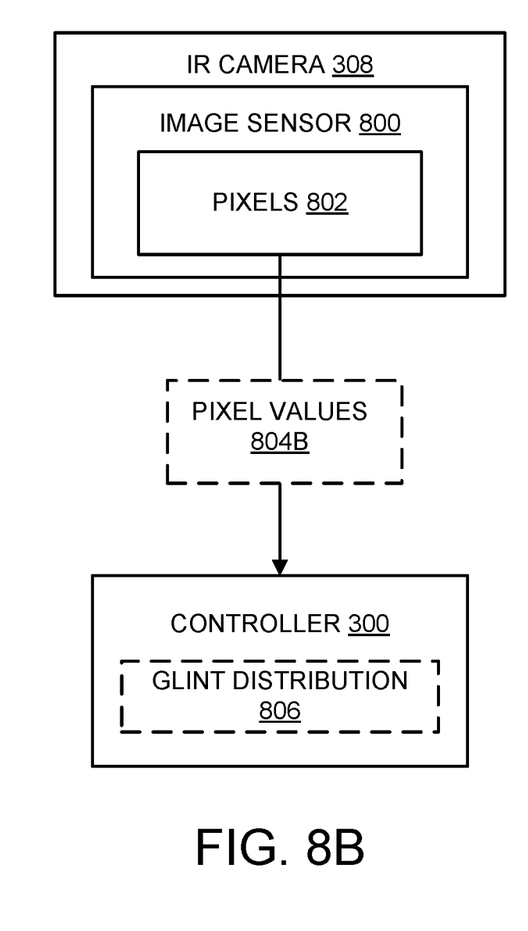

This is schematically illustrated in FIGS. 8A and 8B. Specifically, FIG. 8A schematically illustrates activity of controller 300 during the reference frame. In FIG. 8A, IR camera 308 includes an image sensor 800, which in turn includes a plurality of pixels 802. Controller 300 reads pixel values 804A corresponding to all of the plurality of pixels 802.

By contrast, FIG. 8B schematically illustrates activity of controller 300 during the subsequent frame. Controller 300 reads pixel values 804B from pixels 802 of image sensor 800. In FIG. 8B, however, the controller reads pixel values corresponding to less than all of the pixels 802, indicated by the smaller size of the box representing pixel values 804B as compared to the box representing pixel values 804A. The specific pixel values read by controller 300 in FIG. 8B may be determined based at least in part on a first glint distribution 806 depicted in an IR image captured during the reference frame, as described above.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
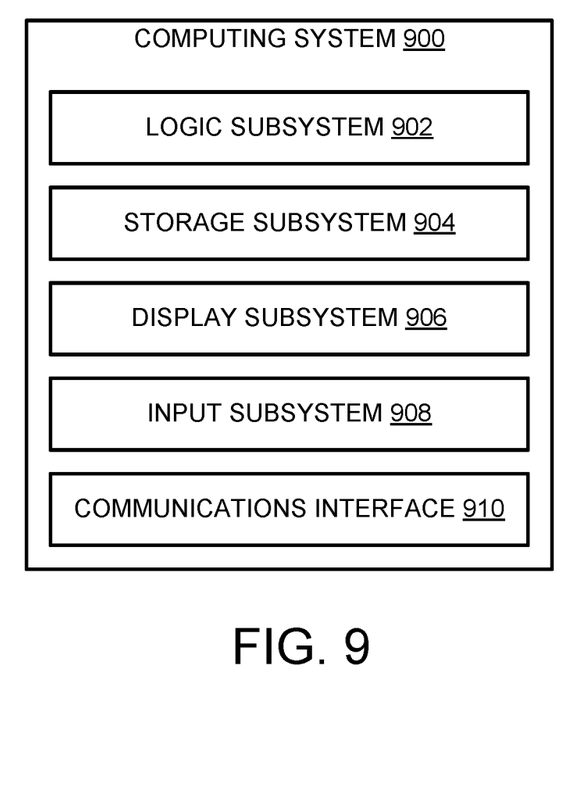
FIG. 9 schematically shows an example computing system.

FIG. 9 schematically shows a simplified representation of a computing system 900 configured to provide any to all of the compute functionality described herein. For example, computing system 900 may control gaze detection assembly 106 described above, and/or computing system 900 may perform one or more of the functions described above with respect to the gaze detection assembly. Computing system 900 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. In some cases, controller 300 described above may be implemented as logic subsystem 902. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a gaze detection assembly comprises: a plurality of infrared (IR) light emitters configured to emit IR light toward a user eye; an IR camera configured to sequentially capture IR images of the user eye; and a controller configured to: during a reference frame, control the plurality of IR light emitters to emit IR light toward the user eye with a reference intensity distribution; during the reference frame, capture a first IR image of the user eye, the first IR image depicting a first glint distribution on the user eye; based at least in part on the first glint distribution, during a subsequent frame, control the plurality of IR light emitters to emit IR light toward the user eye with a subsequent intensity distribution, different than the reference intensity distribution; and during the subsequent frame, capture a second IR image of the user eye, the second IR image depicting a second glint distribution on the user eye. In this example or any other example, controlling the plurality of IR emitters to emit IR light toward the user eye with the subsequent intensity distribution includes reducing an intensity of the IR light emitted by one or more IR light emitters relative to the reference intensity distribution. In this example or any other example, controlling the plurality of IR emitters to emit IR light toward the user eye with the subsequent intensity distribution includes deactivating one or more IR light emitters relative to the reference intensity distribution. In this example or any other example, the controller is configured to identify correspondences between individual glints of the first glint distribution and individual IR light emitters of the plurality of IR light emitters, and deactivate the one or more IR light emitters includes deactivating an IR light emitter that does not correspond to a glint of the first glint distribution. In this example or any other example, emitting IR light toward the user eye with the subsequent intensity distribution consumes less electrical power than emitting IR light toward the user eye with the reference intensity distribution. In this example or any other example, the controller is configured to output a first gaze direction estimate of the user eye during the reference frame based at least in part on the first glint distribution, and output a second gaze direction estimate of the user eye during the subsequent frame based at least in part on the second glint distribution. In this example or any other example, the controller is configured to output a first confidence parameter based at least in part on the first glint distribution, and a second confidence parameter based at least in part on the second glint distribution. In this example or any other example, the controller is configured to, during a recheck frame occurring one or more frames after the subsequent frame, control the plurality of IR light emitters to emit IR light toward the user eye with the reference intensity distribution. In this example or any other example, the recheck frame is one of a plurality of periodically reoccurring recheck frames separated from one another by a predetermined recheck interval. In this example or any other example, the recheck frame is triggered responsive to the controller outputting a gaze direction estimate of the user eye having an associated confidence parameter below a predetermined confidence threshold. In this example or any other example, the recheck frame is triggered responsive to the controller outputting a gaze direction estimate of the user eye that differs from a preceding gaze direction estimate by more than a difference threshold. In this example or any other example, the IR camera includes an image sensor having a plurality of pixels, the controller reads pixel values from each of the plurality of pixels during the reference frame, and based at least in part on the first glint distribution, the controller reads pixel values from less than all of the plurality of pixels during the subsequent frame. In this example or any other example, the gaze detection assembly is a component of a head-mounted display device configured to present virtual imagery to the user eye.

In an example, a method for a gaze detection assembly comprises: during a reference frame, controlling a plurality of IR light emitters to emit IR light toward a user eye with a reference intensity distribution; during the reference frame, capturing a first IR image of the user eye via an IR camera, the first IR image depicting a first glint distribution on the user eye; based at least in part on the first glint distribution, during a subsequent frame, controlling the plurality of IR light emitters to emit IR light toward the user eye with a subsequent intensity distribution, different than the reference intensity distribution; and during the subsequent frame, capturing a second IR image of the user eye via the IR camera, the second IR image depicting a second glint distribution on the user eye. In this example or any other example, controlling the plurality of IR emitters to emit IR light toward the user eye with the subsequent intensity distribution includes reducing an intensity of the IR light emitted by one or more IR light emitters relative to the reference intensity distribution. In this example or any other example, the method further comprises outputting a first gaze direction estimate of the user eye during the reference frame based at least in part on the first glint distribution, and outputting a second gaze direction estimate of the user eye during the subsequent frame based at least in part on the second glint distribution. In this example or any other example, the method further comprises, during a recheck frame occurring one or more frames after the subsequent frame, controlling the plurality of IR light emitters to emit IR light toward the user eye with the reference intensity distribution. In this example or any other example, the recheck frame is one of a plurality of periodically reoccurring recheck frames separated from one another by a predetermined recheck interval. In this example or any other example, the recheck frame is triggered responsive to a controller of the gaze detection assembly outputting a gaze direction estimate of the user eye having an associated confidence parameter below a predetermined confidence threshold.

In an example, a gaze detection assembly comprises: a plurality of infrared (IR) light emitters configured to emit IR light toward a user eye; an IR camera configured to sequentially capture IR images of the user eye; and a controller configured to: during a reference frame, control the plurality of IR light emitters to emit IR light toward the user eye with a reference intensity distribution; during the reference frame, capture a first IR image of the user eye, the first IR image depicting a first glint distribution on the user eye; output a first gaze direction estimate of the user eye based at least in part on the first glint distribution; during a subsequent frame, based at least in part on the first glint distribution, control the plurality of IR light emitters to emit IR light toward the user eye with a subsequent intensity distribution, different than the reference intensity distribution, by reducing one or both of: an intensity of the IR light emitted by the plurality of IR light emitters as compared to the reference intensity distribution, and a quantity of the IR light emitters emitting IR light toward the user eye as compared to the reference intensity distribution; during the subsequent frame, capture a second IR image of the user eye, the second IR image depicting a second glint distribution on the one of the user eye; and output a second gaze direction estimate of the user eye based at least in part on the second glint distribution.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A gaze detection assembly, comprising:
   a plurality of infrared (IR) light emitters configured to emit IR light toward a user eye;
   an IR camera configured to sequentially capture IR images of the user eye; and
   a controller configured to:
     during a reference frame, control the plurality of IR light emitters to emit IR light toward the user eye with a reference intensity distribution;
     during the reference frame, capture a first IR image of the user eye, the first IR image depicting a first glint distribution on the user eye;
     based at least in part on the first glint distribution, during a subsequent frame, control the plurality of IR light emitters to emit IR light toward the user eye with a subsequent intensity distribution, different than the reference intensity distribution;
     during the subsequent frame, capture a second IR image of the user eye, the second IR image depicting a second glint distribution on the user eye; and
     on a recheck frame occurring one or more frames after the subsequent frame, control the plurality of IR light emitters to emit IR light toward the user eye with the reference intensity distribution, wherein the recheck frame is triggered responsive to the controller outputting a gaze direction estimate of the user eve having an associated confidence parameter below a predetermined confidence threshold.

2. The gaze detection assembly of claim 1, wherein controlling the plurality of IR emitters to emit IR light toward the user eye with the subsequent intensity distribution includes reducing an intensity of the IR light emitted by one or more IR light emitters relative to the reference intensity distribution.

3. The gaze detection assembly of claim 1, wherein controlling the plurality of IR emitters to emit IR light toward the user eye with the subsequent intensity distribution includes deactivating one or more IR light emitters relative to the reference intensity distribution.

4. The gaze detection assembly of claim 3, wherein the controller is configured to identify correspondences between individual glints of the first glint distribution and individual IR light emitters of the plurality of IR light emitters, and deactivating the one or more IR light emitters includes deactivating an IR light emitter that does not correspond to a glint of the first glint distribution.

5. The gaze detection assembly of claim 1, wherein emitting IR light toward the user eye with the subsequent intensity distribution consumes less electrical power than emitting IR light toward the user eye with the reference intensity distribution.

6. The gaze detection assembly of claim 1, wherein the controller is configured to output a first gaze direction estimate of the user eye during the reference frame based at least in part on the first glint distribution, and output a second gaze direction estimate of the user eye during the subsequent frame based at least in part on the second glint distribution.

7. The gaze detection assembly of claim 6, wherein the controller is configured to output a first confidence parameter based at least in part on the first glint distribution, and a second confidence parameter based at least in part on the second glint distribution.

8. The gaze detection assembly of claim 1, wherein the recheck frame is additionally triggered responsive to the controller outputting the gaze direction estimate of the user eye that differs from a preceding gaze direction estimate by more than a difference threshold.

9. The gaze detection assembly of claim 1, wherein the IR camera includes an image sensor having a plurality of pixels, the controller reads pixel values from each of the plurality of pixels during the reference frame, and based at least in part on the first glint distribution, the controller reads pixel values from less than all of the plurality of pixels during the subsequent frame.

10. The gaze detection assembly of claim 1, wherein the gaze detection assembly is a component of a head-mounted display device configured to present virtual imagery to the user eye.

11. A method for a gaze detection assembly, the method comprising:
    during a reference frame, controlling a plurality of IR light emitters to emit IR light toward a user eye with a reference intensity distribution;
    during the reference frame, capturing a first IR image of the user eye via an IR camera, the first IR image depicting a first glint distribution on the user eye;
    based at least in part on the first glint distribution, during a subsequent frame, controlling the plurality of IR light emitters to emit IR light toward the user eye with a subsequent intensity distribution, different than the reference intensity distribution;
    during the subsequent frame, capturing a second IR image of the user eye via the IR camera, the second IR image depicting a second glint distribution on the user eye; and
    on a recheck frame occurring one or more frames after the subsequent frame, controlling the plurality of IR light emitters to emit IR light toward the user eye with the reference intensity distribution, wherein the recheck frame is triggered responsive to a controller of the gaze detection assembly outputting a gaze direction estimate of the user eye differing from a preceding gaze direction estimate by more than a difference threshold.

12. The method of claim 11, wherein controlling the plurality of IR emitters to emit IR light toward the user eye with the subsequent intensity distribution includes reducing an intensity of the IR light emitted by one or more IR light emitters relative to the reference intensity distribution.

13. The method of claim 11, further comprising outputting a first gaze direction estimate of the user eye during the reference frame based at least in part on the first glint distribution, and outputting a second gaze direction estimate of the user eye during the subsequent frame based at least in part on the second glint distribution.

14. The method of claim 11, wherein the recheck frame additionally is triggered responsive to the controller of the gaze detection assembly outputting the gaze direction estimate of the user eye having an associated confidence parameter below a predetermined confidence threshold.

15. A gaze detection assembly, comprising:
    a plurality of infrared (IR) light emitters configured to emit IR light toward a user eye;
    an IR camera configured to sequentially capture IR images of the user eye; and
    a controller configured to:
        during a reference frame, control the plurality of IR light emitters to emit IR light toward the user eye with a reference intensity distribution;
        during the reference frame, capture a first IR image of the user eye, the first IR image depicting a first glint distribution on the user eye;
        output a first gaze direction estimate of the user eye based at least in part on the first glint distribution;
        during a subsequent frame, based at least in part on the first glint distribution, control the plurality of IR light emitters to emit IR light toward the user eye with a subsequent intensity distribution, different than the reference intensity distribution, by reducing one or both of:
            an intensity of the IR light emitted by the plurality of IR light emitters as compared to the reference intensity distribution, and
            a quantity of the IR light emitters emitting IR light toward the user eye as compared to the reference intensity distribution;
        during the subsequent frame, capture a second IR image of the user eye, the second IR image depicting a second glint distribution on the of the user eye;
        output a second gaze direction estimate of the user eye based at least in part on the second glint distribution; and
        on a recheck frame occurring one or more frames after the subsequent frame, control the plurality of IR light emitters to emit IR light toward the user eye with the reference intensity distribution, wherein the recheck frame is triggered responsive to the controller outputting a subsequent gaze direction estimate of the user eye having an associated confidence parameter below a predetermined confidence threshold.

* * * * *